United States Patent [19]

Simon

[11] 4,419,492
[45] Dec. 6, 1983

[54] PROCESS FOR PREPARING ABS POLYMERIC POLYBLENDS

[75] Inventor: Robert H. M. Simon, Longmeadow, Mass.

[73] Assignee: Monsanto Company, St. Louis, Mo.

[21] Appl. No.: 290,645

[22] Filed: Aug. 6, 1981

[51] Int. Cl.³ .................... C08L 51/00; C08L 53/00
[52] U.S. Cl. ...................................... 525/71; 525/53; 525/54; 525/243
[58] Field of Search ................ 525/71, 243, 53, 54

[56] References Cited

U.S. PATENT DOCUMENTS 3,576,910  4/1971  Jastrzebski .................... 525/71

Primary Examiner—J. Ziegler
Attorney, Agent, or Firm—Michael J. Murphy

[57] ABSTRACT

The invention relates to a process for preparing ABS polyblends having small and large grafted rubber particles dispersed therein providing polyblends having greater toughness and chemical resistance. The process includes extracting small grafted rubber particles into a separated monomer phase which is mass polymerized to a first melt, mixing said first melt with a second melt having present larger grafted rubber particles to form a third melt which is devolatilized to an ABS polyblend having a bimodal grafted rubber particle size distribution.

25 Claims, No Drawings

PROCESS FOR PREPARING ABS POLYMERIC POLYBLENDS

BACKGROUND OF THE INVENTION

In the commercial production of rubber modified polyblends of the type wherein rubber particles of alkadiene rubber grafted with a styrene-type monomer and acrylonitrile-type monomer are generally uniformly dispersed in a matrix of a copolymer of styrene-type monomer and acrylonitrile-type monomer, which are commonly called ABS polyblends, it has heretofore been a common commercial practice to use either suspension or emulsion polymerization procedures for the preparation thereof. A given product resin is produced either as a result of a single batch polymerization or as a result of several batch polymerization followed by a physical blending procedure involving mixture of pre-formed graft copolymers with other graft copolymers or with ungrafted copolymer. Because of the inherent cost, complexity and sensitivity associated with such manufacturing technology, the art has recently been attempting to develop different techniques which would permit one to manufacture such resins using cheaper, less complex, highly reliable procedures and equipment. A particularly promising different technique would involve the use of mass polymerization which avoids such problems as product separation and recovery from the water used for suspension or emulsion polymerization.

To prepare ABS resins by all-mass polymerization technology has been heretofore proposed, but the practical realization of such a manufacturing route on a commercial scale is full of problems because of the difficulties of producing a product resin which is cheap enough to be competitive and still has the necessary and desirable physical properties for molding and extruding and for formed, manufactured product applications. Because of these difficulties, the art has combined some of the mass polymerization technology with some of the emulsion and/or suspension technology in an overall process.

U.S. Pat. No. 3,957,912 has disclosed such hybrid processes wherein the rubbers are grafted in aqueous emulsion as grafted crosslinked rubber particles and extracted from the aqueous phase by monomers into a monomer phase having said grafted rubber particles. The monomer phase is then separated from the aqueous phase and mass polymerized to an ABS polyblend.

Such polyblends generally have large amounts of grafted rubber particles present that range in size from about 0.01 to 0.5 microns based on the rubber particles as polymerized in emulsion. Rubber particles of this small size must be used in amounts of 15 to 45% in the polyblend to insure toughness, hence, lack rubber toughening efficiency. It has been found that small amounts of larger particles can be used in combination with the smaller particles to increase toughness without loss of gloss. Here, 5 to 50% of the large can be used to optimize toughness and chemical resistance wherein the large rubber particles have an average diameter of about 1 to 10 microns.

Large rubber particles, over about 0.5 microns, are difficult to prepare and graft in emulsion as such particles are not emulsion stable and the relatively small surface area does not provide for optimum levels of graft to insure their compatibility with the matrix copolymer phase.

It has been found that such large grafted rubber particles can be prepared by the mass polymerization of monomers having about 2 to 15% rubber dissolved therein as monomer-rubber solutions. During polymerization the rubber separates out as rubber particles having present about 1 to 5 parts of the monomers present as grafted and occluded polymers, said rubber particles having a particle size ranging from 1 to 10 microns. Such monomer-rubber solutions can be mass polymerized continuously to form ABS polyblend melts having about 2 to 15% of a rubber moiety which can be mixed and blended with the polyblend melts having rubber particles in the range of 0.01 to 0.5 microns as carried out in the present process.

U.S. Pat. No. 3,509,237 disclosed an ABS polyblend having grafted rubber particles with a bimodal particle size distribution. The process mixes an emulsion polymerized polymer with a suspension polymerized polymer, hence, does not provide the economics of using the mass polymerization process of the present process to prepare the final ABS polymeric polyblends wherein the matrix phase is all mass polymerized providing polymers of greater toughness and chemical resistance which have greater transparency and gloss.

SUMMARY OF THE INVENTION

The present invention relates to a process for producing ABS polymeric polyblends having dispersed alkadiene rubber particles grafted with monovinylidene aromatic and alkenenitrile monomers, said rubber particles having a bimodal rubber particle size distribution and being dispersed in a matrix copolymer of said monomers the steps comprising:

A. grafting by aqueous emulsion graft polymerization an alkadiene rubber with a monovinylidene aromatic monomer and an alkenenitrile monomer to produce first grafted rubber particles in an aqueous latex having a particle size of about 0.01 to 0.8 microns, B. mixing with said latex from 30 to 400 parts per hundred parts of latex rubber solids by weight of at least one monoethylenically unsaturated monomer selected from the group consisting of monovinylidene aromatic monomers and alkenenitrile monomers, C. extracting said first grafted rubber latex particles from said aqueous latex into the monomer forming a dispersion of said particles in the monomer phase, said aqueous latex forming a separate free water phase, D. separating said free water phase from said monomer phase, E. subjecting said first grafted rubber particles dispersed in said monomer phase to mass polymerization conditions to produce an ABS composition comprising said alkadiene grafted rubber particles dispersed in said matrix copolymer and unreacted monomers as a first melt, F. mixing said first melt with a second melt of said matrix copolymer having second grafted rubber particles dispersed therein, said second particles having a rubber particle size of about 1.0 to 10 microns forming a third melt having first and second grafted diene rubber particles dispersed therein, G. devolatilizing said third melt so as to remove said unreacted monomers providing said ABS polyblend comprising said matrix copolymer having said first and second diene rubber particles dispersed therein such that said rubber particles have a bimodal particle size distribution.

DESCRIPTION OF PREFERRED EMBODIMENTS

As discussed above the production of ABS and related rubber modified resins requires the production of a copolymer grafted rubber from an initial rubber latex. For the purposes of the present invention, the graft rubber copolymer is produced by polymerizing the superstrate monomers in the presence of the preformed rubber substrate under emulsions conditions. In such a graft polymer system, it is generally not possible to separate any ungrafted rubber from the polymerized (grafted) rubber, and the amount of ungrafted rubber is usually very small, i.e., less than 2% and preferably less than 0.5%, by weight based on total graft rubber copolymer weight. Also, since 100% grafting efficiency of superstrate monomers to rubber substrate normally is approached only at very low weight ratios of monomers to substrate at least a portion of the monomers polymerized in the presence of the preformed rubber substrate will not chemically combine therewith so as to provide a graft copolymer product. This non-combined copolymer portion may be increased or decreased depending upon the ratio of monomers to rubber, the particular monomer starting formulation, the nature of the rubber, the conditions of polymerization and the like, as those skilled in the art appreciate. Hence, a graft copolymer composition typically contains some amount of a second (ungrafted) copolymer of monovinylidene aromatic monomer and alkenenitrile monomer by reason of available methods of making a graft copolymer for use in the practice of the present invention. In general, any of the known emulsion graft polymerization processes may be used to accomplish graft polymerization of the superstrate monomers to the preformed elastomer alkadiene substrate. Such techniques are generally well known to those skilled in the art.

Various alkadiene rubbers may be employed as a substrate, including conjugated 1,3-diene rubbers, ethylenepropylenediene terpolymer rubbers, acrylate-diene copolymer rubbers and mixtures thereof. It is now preferred to include at least about 50 weight percent of a conjugated alkadiene component in an elastomer used to make starting compositions for use in this invention.

Preferred substrate rubbers are alkadiene rubbers or mixtures of alkadiene rubbers composed of at least 75 weight percent based on total rubber monomers, such as rubbery polymers having a second order transition temperature not higher than about 0° C., and preferably, not higher than about −20° C. Examples of such conjugated 1,3-dienes include butadiene, isoprene, piperylene, chloroprene and the like. Such rubbers include homopolymers of conjugated 1,3-dienes and interpolymers of such 1,3-dienes with one or more copolymerizable monoethylenically unsaturated monomers, for example monovinylidene aromatic hydrocarbons such as styrene and aralkyl styrenes, and the like; and alphaalkylstyrenes, such as alphamethyl styrene, alpha-ethyl styrene, etc.; vinyl naphthalene, etc.; arhalo monovinylidene aromatic hydrocarbons, such as the chlorostyrenes, 2,4-dibromostyrene, etc.; acrylonitrile; methacrylonitrile; alkyl acrylates and alkyl methacrylates, acrylamides, unsaturated ketones, such as vinyl methyl ketone, methyl isopropenyl ketone, etc.; alphaolefins such as ethylene, propylene, etc.; pyridines; vinyl esters, such as vinyl acetate, vinyl stearate, etc.; vinyl and vinylidene halides and the like.

The rubber may contain up to about 2% of a crosslinking agent based on the weight of the rubber-forming monomer or monomers. The crosslinking agent can be any of the agent conventionally employed for crosslinking diene rubbers, e.g., divinyl benzene, diallyl maleate, diallyl fumarate, diallyl adipate, allyl acrylate, allyl methacrylate, diacrylates and dimethacrylates of polyhydric alcohols, e.g., ethylene glycol dimethacrylate, etc.

A preferred group of rubbers are those consisting of from about 75 to 100% by weight of alkadiene monomers and from about 0 to 25% by weight of a monomer selected from the group consisting of monovinylidene aromatic hydrocarbons, e.g., styrene and unsaturated nitrile, e.g., acrylonitrile or mixtures thereof. Particularly advantageous rubber substrates are butadiene homopolymer or a copolymer of 90 to 95% by weight butadiene and 5 to 10 weight percent of acrylonitrile or styrene.

Emulsion polymerization is preferred over mass or suspension polymerization for polymerizing rubber monomers since such will provide a particle size which is preferred for use in the present invention. Furthermore, emulsion polymerization of rubber monomers produces a latex which is useful as a base or starting point for subsequent emulsion polymerization of the superstrate monomers onto the preferred rubber in the preparation of the graft rubber copolymer.

The graft copolymers may be prepared by polymerizing superstrate monomers in the presence of the preformed rubber substrate, generally in accordance with conventional emulsion graft polymerization techniques. The preferred processes use an emulsion technique to obtain the particle size of not more than about 0.8 microns for the graft polymer which is preferred for use in the practice of the present invention. In such graft polymerization, a preformed rubber substrate latex generally is mixed with the desired monomers and this admixture is polymerized to combine chemically or graft a portion of the superstrate monomers upon the rubber substrate. Depending upon the ratio of monomers to rubber substrate and polymerization conditions, it is possible to regulate both the desired degree of grafting of the superstrate monomers onto the rubber substrate and the polymerization of ungrafted matrix copolymer. The ratio of monomers to rubber charged to the graft polymerization reaction zone is a primary determinant of the superstrate:substrate ratio of the resultant graft copolymer, although conditions of polymerization, rubber chemistry and particle size, rates of monomer addition, chain transfer agents, etc., may also exert an effect.

A polymerization catalyst is generally included and the amount used is generally within the range of from about 0.001 to 3.0 weight percent and preferably from about 0.005 to 0.5 weight percent of the total polymerizable material, the exact amount depending upon the monomers and the desired polymerization cycle.

As is well known, it is often desirable to incorporate molecular weight regulators such as mercaptans, halides and terpenes in relatively small percentages by weight, on the order of from about 0.001 to 2.5% by weight of the polymerizable material. In addition, it may be desirable to include relatively small amounts of antioxidants or stabilizers, such as the conventional alkylated phenols and the like, although these may be added during or after polymerization.

In the emulsion polymerization grafting process, the monomers and rubber substrate are stabilized in water by use of suitable emulsifying agents, such as fatty acid soaps, alkali metal or ammonium soaps of high molecular weight, alkali or alkaryl sulfates and sulfonates, mineral acid salts of long chain aliphatic amines, etc. Emulsifying agents which have proven particularly advantageous are ammonium oleate, sodium palmitate, sodium stearate and other sodium soaps. Generally, the emulsifying agent is provided in amounts of from about 0.1 to 15 parts by weight per 100 parts by weight of the monomers and water is provided in an amount of from about 1 to 4 parts per part of monomers and even in larger ratios where greater dilution is desirable, as those skilled in the art appreciate.

If desired, an aqueous latex formed in the emulsion polymerization of the rubber substrate may provide the aqueous medium onto which the monomers are grafted with or without the addition of further emulsifying agents, water and the like. Various water soluble free radical polymerization initiators are conventionally used for emulsion polymerization of the rubber monomer, including conventional peroxy and azo catalysts and the resulting latex may be used as the aqueous medium in which the graft copolymer monomers are admixed. In this manner, the catalyst for the rubber polymerization may function in whole or part as the catalyst for the graft polymerization. However, additional catalysts may be added at this time of graft polymerization.

Typical emulsion polymerization conditions involve temperatures in the range of from about 20° to 100° C., with agitation and preferably an inert atmosphere. Pressures of from about 1 to 100 pounds per square inch may be employed and monomers and/or additional catalysts may be added incrementally or continuously over a portion of the reaction cycle. Polymerization is preferably continued until substantially all, that is more than 90%, of the monomers have polymerized. The remaining monomers and other volatile components can be distilled away from the latex, if desired, but preferably are allowed to remain in the latex, which is ready for further treatment.

In addition to varying the polymerization conditions, the particle size of the emulsion latex graft particles may also be varied by seeding, agitation, rubber size variation through agglomeration prior to grafting, coagulation techniques, etc. The preferred agglomeration procedures are provided by Dalton's U.S. Pat. Nos. 3,558,541 and 3,551,370.

The particle size of the rubber has an effect upon the optimum grafting level for a graft copolymer. For example, a given weight percentage of smaller size rubber particles will provide considerable higher surface area for grafting than the equivalent weight of a larger size rubber particle. Accordingly, the density of grafting can be varied depending upon the size of the rubber particle. Generally, the smaller graft polymer particles will tolerate a higher superstrate/substrate ratio than the larger size particles.

The particle size of the rubber graft copolymer has a significant effect upon the gloss and physical properties of the product produced by the processes of this invention. Typically, the particle size of the graft copolymers used in the practice of the present invention may be varied from as little as about 0.01 micron to as much as about 1.0 microns and preferably, from about 0.25 to 1.0 microns, depending upon the ultimate properties desired for a given product. Preferred rubber graft copolymers for use in the practice of this invention are those having a weight average particle size of from about 0.01 to 0.8 microns and more preferably from about 0.03 to 0.6 microns as determined by known means such as measurement from a photomicrograph, light scattering or other known tests.

For emulsion polymerization processes, the rubber desirably has a significant degree of crosslinking. With respect to the graft copolymers, at least some degree of crosslinking of the rubber is inherent during the graft polymerization process and this desirably may be augmented through the addition of crosslinking agents or control of the polymerization conditions.

For example, specifically useful latices and mixtures of latices include those of monodisperse relatively large size particles of from about 0.3 to 0.8 microns grafted to a graft superstrate level of from 10–100 parts per 100 parts substrate rubber wherein the particle size is monomodal and sharp, obtained by emulsion polymerization directly or by agglomeration to the desired size and also polydisperse relatively larger size particles across a range of sizes from 0.3 to 0.8 microns grafted to the same graft level and obtained by emulsion polymerization and staged agglomeration to produce the polydispersity of sizes.

Also, useful latex mixtures include, for example, those of mixed high graft level and low graft level small particles of 0.05 to 0.3 microns some with a graft level of 40–100 parts per 100 parts substrate.

The grafted rubber particles are contained in an aqueous latex in amounts of 25 to 65% by weight of the emulsion preferably 30 to 55%. The grafted rubber particles are readily removed from the aqueous latex by mixing with at least one monoethylenically unsaturated monomer selected from the group consisting of monovinylidene aromatic monomers and alkenenitrile monomers, e.g., styrene and acrylonitrile monomers. About 30 to 400 parts of monomers are used per hundred parts of latex solids (grafted rubber particles). The rubber particles are extracted into the monomers as a monomer phase with the residual aqueous latex forming a separate free water phase.

The free water phase is readily separated from the monomer phase by decantation, extrusion, centrifugation or other mechanical means. About 30 to 100 parts of monomers per 100 parts of grafted rubber particles provides stiff to soft pastes of the monomer phase that are readily separated and processed through extrusion type means such as disclosed in U.S. Pat. No. 3,859,217 which will compress the paste allowing the residual water phase to separate as a first stream and the monomer phase as a second stream. The monomer phase can be further diluted with said monovinylidene aromatic and alkenenitrile monomers to adjust the rubber moiety of the monomer phase polymerized so that about 3 to 50% by weight is present in the ABS resin product.

If 100 to 400 parts of monomer per 100 parts of grafted rubber are used the monomer phase is a liquid and is readily separated from the water phase by decantation or centrifugation. The monomer phase may be adjusted with additional monomers to provide the desired rubber content and monomer compositions.

The monomer phase is then subjected to mass polymerization to form an ABS resin having said grafted rubber particles dispersed in a matrix copolymer. Residual unreacted monomer is removed by devolatilization by conventional means wherein the melt from the mass polymerization comprising the matrix polymer, dispersed grafted rubber particles and residual monomers is heated to about 100° to 250° C., and the residual monomers flashed off at subatmospheric pressures either by conventional extrusion or in flash tanks by falling strand devolatilization. A suitable process for devolatilization is that using at least one stage of wiped film devolatilization as disclosed in U.S. Pat. No. 3,797,550.

The ABS resins of the present invention can have a monovinyl aromatic monomer to alkenenitrile monomer weight ratio of 80:20 to 20:80 in both the graft copolymer and matrix copolymer with the monomer composition of the matrix phase generally being about the same as the graft copolymer. The ABS resins having a rubber moiety content ranging from 3 to 50% depending on the physical properties desired.

The extraction of the grafted rubber particles into the monomer phase can be carried out with monomers containing at least one saturated solvent for the graft copolymer. The use of said solvents lower the viscosity of the monomer phase, havng dispersed grafted polymers therein, allowing more rubber to be present during mass polymerizaton.

The saturated solvents can have boiling point of 25° to 250° C., and is present in said monomers in an amount of about 10 to 40% by weight of said monomers and solvent.

The saturated solvents are selected from the group consisting of nitriles, hydrocarbons, halogenated hydrocarbons, lower carboxylic esters, cyclic ethers, formamides and acetamides as described in U.S. Pat. No. 3,957,912 and is hereby incorporated by reference.

The mass polymerization of the monomer phase with or without added monomers is carried out in known manner by employing any known mass polymerization reaction equipment or vessels. Preferably, such mass polymerization is a thermal polymerization conducted in any of the known polymerization vessels adapted for removal of the unreacted monomers and solvents in vapor form. Most preferably, the thermal mass polymerization reaction is conducted with close control of the reaction temperature by means of removal of the monomer vapor from the reaction vessel. Any temperature controlled polymerization reaction equipment from which monomer vapor can be removed can be employed for the preferred mass polymerization step including stirred tank reactors, horizontal stirred cylindrical reactors and other such reactors.

The mass polymerization reaction can be controlled by varying the nature and amounts of the feed streams thereto and the conditions thereof to produce the desired ABS resin product. As is well known, it is often desirable to incorporate molecular weight regulators or chain transfer agents into the polymerization of the matrix copolymer in relatively small quantities. Such chain transfer agents as mercaptans, halides and terpenes can be added in amounts of from 0.001 to 2.0% by weight if desired. The product will consist of a desired matrix copolymer of selected composition, preferably styrene-acrylonitrile, or SAN, copolymer and a dispersion therein of graft rubber particles to produce the desired rubber content. Resins having a rubber moiety content of from 3 to 50 or higher weight percent rubber in the copolymer matrix can be produced. The mass polymerization reaction can be controlled to produce a copolymer solution in unreacted monomers of any desired composition, preferably from about 40 to 75% by weight copolymer solids in unreacted monomers. The product of the preferred thermal mass polymerization reaction is generally in the form of a hot melt of such composition at a temperature of from about 100° to 200° C., depending upon the polymerization temperature conditions.

The hot melt product of mass polymerization is continuously removed from the reactor and thereafter subjected to one or more stages of devolatilization to remove the remaining unreacted monomers and saturated solvent of use and remaining traces of water therefrom. Such devolatilization is conducted in known manner in any desired devolatilizer, either of the wiped film or falling strand type. The devolatilization treatment is generally conducted at temperatures of from about 140° to 280° C., at reduced pressures of from 0.01 to 800 mmHg absolute, preferably at from about 180° to 260° C., and at pressures at from 2 to 200 mm abs. The product of the devolatilization stage is in the resin product composition substantially freed of free or unreacted monomers as well as solvent and water. Such free or residual monomer level is reduced to less than 1.0% by weight and desirably to less than 0.4% by weight.

The first melt then is prepared by steps (A) through (F) as described. The second melt having a matrix copolymer with large grafted rubber particles can be prepared by mass polymerization of monomers (styrene/acrylonitrile, e.g.) alkadiene rubber solutions. Here, the alkadiene rubbers preferred are the class described heretofor, i.e., polybutadiene or copolymers of butadiene with, e.g., styrene and acrylonitrile. These rubbers must be soluble in the monomers used as contrasted to the rubbers grafted in emulsion which preferable have a degree of crosslinking described. The second melt can be prepared by the batch or continuous mass polymerization of rubber-monomer solutions. One such functional process is described in U.S. Pat. No. 4,252,911 and is hereby incorporated by reference. This process relates to a continuous mass polymerization process for ABS polyblends wherein a monomer formulation of monoalkenyl aromatic and alkenyl nitrile monomers having a conjugated diene rubber dissolved therein is continuously charged to a first, stirred reaction zone operating at a steady conversion of said monomers of about 5 to 45% forming a partially polymerized first mixture having said rubber dispersed as grafted rubber particles, followed by continuously polymerizing said first mixture in a second stirred reaction zone by substantial linear flow polymerization under evaporative cooling of said monomers to a second partially polymerized mixture containing about 50 to 90% of ABS polyblend solids and separating said solids from said second mixture as an ABS polyblend.

The process preferable is run to a conversion of 50 to 90% of said monomers forming said second partially polymerized mixture as a second melt and feed stock for the present process in step (F).

The following examples are set forth to illustrate more clearly the principles and practice of this invention to one skilled in the art. They are not intended to be restrictive but merely illustrative of the invention herein described.

EXAMPLE 1

Rubber Latex Preparation-Step A

A rubber latex was prepared by emulsion polymerizing a monomer formulation of butadiene/acrylonitrile monomer having a monomer ratio of B/AN of 97/3 using about a 1:1 monomer water ratio having 3% Rubber Reserve Soap based on water at temperature of 77° C., with $K_2S_4O_8$ initiator (0.5% by weight based on monomer) providing a latex of about 42% solids of rubber particles having a particle size of about 0.08 microns.

Rubber Latex Agglomeration-Step B

The rubber latex of Step A (2600 gms) was mixed with 780 gms of water containing 13 cc of acetic anhydride and let stand for about 25 minutes at 35° C. The rubber latex agglomerates to a particle size of about 0.4 microns and was stabilized with about 200 gms of an acid-stable emulsifier (dodecyl diphenyl ether sulfonate (10% solution in $H_2O$).

Rubber Latex Grafting-Step C

The agglomerated rubber latex of Step B (2600 gms) was grafted with 350 gms of styrene and 150 grams of acrylonitrile as a monomer formulation using 27 grams of a 4% solution of $K_2S_2O_8$ and 27 grams of a 2% solution of potassium bisulfite as a redox initiating system. The grafting was carried out at about 80° C., to about 98% conversion.

Grafted Latex Dewatering-Step D

The grafted latex was dewatered by coagulating with $Al_2(SO_4)_3$ (10% solution) followed by treating the system with 1280 grams of a 50/50 styrene/acrylonitrile monomer phase to extract the grafted rubber particles into the monomer phase. The water phase was decanted off leaving the monomer/grafted rubber phase as a separate phase.

Mass Polymerization-Step E

The monomer/grafted rubber phase of Step D was dispersed in a monomer formulation wherein the final monomer ratios were 70% by weight of styrene and 30% by weight of acrylonitrile, said monomer formulation containing about 20% by weight of the grafted rubber particles as a polymerizable mixture. The mixture was mass polymerized in a reactor of the type as described in U.S. Pat. No. 3,751,010 at 154° C., and 105 psig to a monomer conversion of about 70%. The polymerizable mixture was purged and saturated with nitrogen gas prior to polymerization being under positive nitrogen pressure during polymerization to control the temperature at about 154° C. The partially polymerized mixture was devolatilized in a vacuum oven at about 30 min. (75 cm) of mercury at 200° C., for 30 minutes reducing the residual monomers to about 0.5%. The partially polymerized mixture was also withdrawn from the reactor as a first melt and fed to a back mixed tank.

The partially polymerized ABS melt was analyzed for gel content, i.e., grafted rubber particles. The particles were found to have a particle size of about 0.4 microns as polymerized. The devolatilized ABS polyblend was found to have about 20% rubber with the rubber particles being grafted with about 50 parts of copolymer per 100 parts of rubber. The Izod impact strength of the ABS polyblend was 3.2 ft.lbs. based on the ASTM D-256 test.

Preparation of Second Melt

A monomer formulation comprising 5 parts by weight of stereospecific polybutadiene rubber in 95 parts by weight of a 75/25 styrene/acrylonitrile monomers is prepared by agitating the mixture of finely cut rubber and monomer at 40° C., for 8 hours. The rubber used contains approximately 35% cis-1,4 structure; approximately 55% trans-1,4 structure and approximately 10% vinyl-1,2 structure having a Mooney viscosity of the rubber (ML-4, 212° F.) at 35 (the rubber is commercially available from the Firestone Rubber Co., Akron, Ohio under the trade name (Diene 35) and 0.1 part by weight of octadecyl 3-(3',5'-di-tertbutyl-4-hydroxyphenyl) propionate. This monomer formulation is fed continuously at approximately 15 lbs./hr. along with terpinolene at 0.015 lbs./hr. (0.1%) to an anchor-agitated initial reactor operated at approximately 50% fillage of the monomer formulation and 100° C., under 10 psig nitrogen pressure. The agitator turns at 65 rpm. A first partially polymerized mixture containing approximately 18% SAN is pumped from the above reactor after steady state polymerization is reached at a continuous rate such as to maintain essentially constant fillage therein.

The first partially polymerized mixture is fed continuously to the second reactor, a staged isobaric stirred reactor. The second reactor operates at about 40% fillage. The agitator consists of a horizontal shaft on which are fixed a series of paddles about alternating at right angles to one another. Along the shaft and rotating with it are four circular discs with an average radial wall clearance of about ⅜ inch rotating at 15 rpm. These discs are positioned to divide the reactor into five stages of approximately equal volume. The pressure in this reactor is maintained at approximately 55 psia. The second partially polymerized mixture in the final stage is maintained at about 160° C., and contains about 60 weight percent of SAN after passing through five stages, along with 5 weight percent of rubber and 35 weight percent of monomer.

The styrene/acrylonitrile vapors evaporated from the second reactor are condensed and the condensate is returned to the first compartment. The evaporated monomers have a ratio of styrene to acrylonitrile of 70/30. The composition of the vapor phase is brought into substantial equilibrium with the composition of the liquid phase under steady state polymerization and reflux by acrylonitrile addition. The second partially polymerized mixture is pumped continuously from the final stage at a rate to maintain essentially constant fillage in the second reactor as a second melt or second partially polymerized mixture which is delivered to the inlet of a tube and shell heat exchanger preheater. The third partially polymerized mixture exits from the preheater at approximately 240° C., and enters a devolatilizer chamber maintained at 50 torr. The devolatilized melt is fed from the devolatilizer chamber to an extruder which forms it into a plurality of strand which are then cooled and cut into pellets.

It is to be noted that the first reactor was run at 124° C., and the second reactor at about 160° C., with the first reactor making a higher average molecular weight first polymer and the second reactor making a lower average molecular weight second polymer. The preheater of the separator step was run at 240° C., causing crosslinking of the first rubber phase giving the rubber phase a swelling index 9. The combined SAN polymers of the rigid phase is found to have an average molecular weight of about 90,000 Staudinger and a dispersion index of 3.1 representative of the molecular weight distribution. The grafted rubber particles have a desirable morphology having a particle size of 1.5 microns and having a graft and occlusion level to rubber ratio of 1.70 to 1.0.

Melt Blending-Step F

The second melt stream had about 60% conversion to copolymer with 35% monomer and 5% rubber which was fed to the flow-through back mixed tank and blended uniformly with the first melt stream to form a third melt stream. The first and second melt streams were fed continuously to the mixer in a weight ratio of about 90 parts of the first to 10 parts of the second melt stream providing about 90% by weight of small rubber particles and about 10% by weight large particles to the third melt stream.

Devolatilization-Step G

The third melt stream was fed continuously to the devolatilizer used for the second melt stream, devolatilized and extruded into pellets. The pellets having about 20% rubber moiety had an impact strength of about 5.1 ft.lbs. showing the surprising effect of having a bimodal particle size in the ABS polyblend wherein only about 10% large particles increased the toughness substantially. The gloss of the molded samples was about 90 on a scale of 100. Gloss measurements on the first melt stream polymer having only small particles was about 96 whereas gloss measurements on the second melt stream polymer having only large particles was about 43. Surprisingly only 10% large particles increased the impact strength or toughness some 60% yet maintained very high gloss consistent with molding resins having great utility.

The mixing of Step F can be carried out in any conventional closed mixing means that can contain a hot melt without loss of volatiles. This can be a batch mixer or a flowthrough stirred tank that insures back mixing and uniform mixing of the first and second melt streams before passing on through a conduit means to a devolatilizer.

An efficient mixing means can be a static pipe conveyor having mixing vane in the pipe. Here, the pipe would be fed by the two streams and mixed continuously and efficiently in line.

What is claimed is:

1. A process for producing ABS polymeric polyblends having dispersed alkadiene rubber particles grafted with monovinylidene aromatic and alkenenitrile monomers, said rubber particles having a bimodal rubber particle size distribution and being dispersed in a matrix copolymer of said monomers, the sequential steps: consisting essentially of:
   A. grafting by aqueous emulsion graft polymerization an alkadiene rubber with a monovinylidene aromatic monomer and an alkenenitrile monomer to produce first graft rubber particles in an aqueous latex having a particle size of about 0.01 to 0.8 microns,
   B. mixing with said latex, having 30 to 400 parts per hundred parts of latex rubber solids by weight, at least one additional monoethylenically unsaturated monomer selected from the group consisting of monovinylidene aromatic monomers and alkenenitrile monomers,
   C. extracting said first grafted rubber particles from said aqueous latex into the additional monomer forming a dispersion of said particles in the additional monomer, and leaving a separate free water phase,
   D. separating said free water phase from said additional monomer containing the first grafted rubber particles and adjusting said additional monomer with at least one monoethylenically unsaturated monomer such that the weight ratio of monoethylenically unsaturated aromatic to alkenyl nitrile monomer is about 80:20 to 20:80,
   E. subjecting said first grafted rubber particles dispersed in said adjusted additional monomer having said weight ratio to mass polymerization conditions to produce a composition comprising said grafted rubber particles dispersed in a first matrix copolymer of said adjusted additional monomers as a first melt,
   F. mixing said first melt with a second melt prepared by mass polymerization forming a second matrix copolymer of monovinylidene aromatic and alkenyl nitrile monomers having second grafted rubber particles dispersed therein, said second particles having a rubber particle size of about 1.0 to 10 microns being grafted with alkenyl nitrile and monovinylidene aromatic monomers forming a third melt having said first and second grafted rubber particles dispersed in said first and second matrix copolymers,
   G. devolatilizing said third melt so as to remove unreacted monomers providing said ABS polyblend comprising said first and second matrix copolymers having said first and second grafted rubber particles dispersed therein such that said rubber particles have a bimodal particle size distribution.

2. A process of claim 1 wherein said monovinylidene aromatic monomer is selected from the group consisting of styrene, alphamethyl styrene, chlorostyrene, bromostyrene and paramethyl styrene.

3. A process of claim 1 wherein said alkenenitrile monomer is selected from the group consisting of acrylonitrile and methacrylonitrile.

4. A process of claim 1 wherein said monoethylenically unsaturated monomers used in step (B) are a mixture of styrene and acrylonitrile, said mixture containing not more than about 50% by weight of styrene.

5. A process of claim 1 wherein said monomer used in step (B) is styrene.

6. A process of claim 1 wherein said monomer used in step (B) is acrylonitrile.

7. A process of claim 1 wherein said adjusted additional monomer having said weight ratio is adjusted in step (E) with said aromatic and nitrile monomers such that the rubber moiety of the dispersed rubber particles is present in the ABS polyblend formed in step (G) in an amount of 3 to 50% by weight of said ABS polyblend.

8. A process of claim 1 wherein said third melt is heated to temperatures of 180° to 250° C. before devolatilization is carried out in step (G).

9. A process of claim 1 wherein said mass polymerization is carried out at 100° to 200° C.

10. A process of claim 1 wherein said mass polymerization is carried out under continuous mass polymerization conditions in a stirred tank flow through reactor being cooled by evaporation of said monomers.

11. A process of claim 1 wherein said grafted rubber latex is coagulated prior to extraction into said monomer.

12. A process of claim 11 wherein said coagulation is carried out by mixing said latex with a sufficient amount of a coagulant selected from the group consisting of acids, salts, polyelectrolytes and cationic surfactants.

13. A process of claim 12 wherein said salt is aluminum sulfate, sodium chloride or magnesium sulfate.

14. A process of claim 1 wherein said additional monomer used in step (B) contain at least one saturated solvent for a graft copolymer of said monovinylidene aromatic and alkenyl nitrile monomers.

15. A process of claim 14 wherein said solvent has a boiling point between 25° to 250° C. as is present in said monomers in an amount of about 10 to 40% by weight of said monomers and solvent.

16. A process of claim 15 wherein said solvent is selected from the group consisting of nitriles, hydrocarbons, halogenated hydrocarbons, lower carboxylic esters, cyclic ethers, formamides and acetamides.

17. A process of claim 16 wherein said solvent is propionitrile.

18. A process of claim 14 wherein the graft and matrix copolymer is a styrene-acrylonitrile copolymer.

19. A process of claim 1 wherein said mass polymerization is carried out to about 50 to 90% conversion of said monomers wherein said rubber becomes dispersed as second grafted rubber particles having a particle size of about 1.0 to 10 microns and having present about 1 to 5 parts of said monomers as grafted and occluded copolymer per part of rubber.

20. A process of claim 1 wherein said first melt and said second melt are mixed in weight ratios such that the rubber moiety of said ABS polyblend is about 50 to 90% by weight of said first grafted rubber particles and 10 to 50% by weight of said second grafted rubber particles, said rubber moiety being about 5 to 50% by weight of said ABS polyblend.

21. A process of claim 1 wherein said first melt has a rubber moiety of about 15 to 45% by weight based on said melt.

22. A process of claim 1 wherein said second melt has a rubber moiety of about 2 to 15% by weight based on said melt.

23. A process of claim 1 wherein said first grafted rubber particles have present about 10 to 250 parts of said monomer grafted as copolymer per 100 parts of rubber.

24. A process of claim 1 wherein steps (E), (F) and (G) are carried out continuously by feeding said adjusted additional monomer having said weight ratio continuously to a mass polymerization reaction zone forming said first melt continuously as an effluent from said zone, mixing said second melt continuously with said first melt forming said third melt and continuously devolatilizing said third melt to said ABS polyblend.

25. A process of claim 1 wherein said second melt has been extended with additional matrix copolymer in amounts sufficient to prepare said polyblends with a matrix phase of about 55 to 95% by weight of said polyblend wherein said additional matrix copolymer is comprised of said monovinylidene aromatic and alkenyl nitrile monomers.

* * * * *